Patented Nov. 10, 1936

2,060,539

UNITED STATES PATENT OFFICE 2,060,539

PROCESS FOR OBTAINING FREE SILVER AND IODINE FROM SILVER IODIDE

Joseph R. Spies, College Park, Md.

No Drawing. Application May 21, 1935, Serial No. 22,574

6 Claims. (Cl. 23—216)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to me of any royalty thereon.

This invention relates to the preparation of silver and iodine from silver iodide.

The objects of my invention are to provide an improved, economical method for obtaining both free silver and iodine from silver iodide. This process would be useful in the arts by providing a method of recovering silver and iodine from photographic residues, ores, natural brines such as oil field brines, and other residues containing silver iodide.

I have discovered that aqua regia (1 part concentrated nitric acid to 3 parts concentrated hydrochloric acid by volume; variations of this ratio are sometimes employed) readily reacts with silver iodide to form, quantitatively, silver chloride and iodine monochloride.

The reaction is substantially as follows:

$$HNO_3 + 3HCl \longrightarrow Cl_2 + NOCl + 2H_2O$$
$$AgI + Cl_2 \longrightarrow AgCl + ICl$$

When the silver iodide was ground to 40 mesh and agitated the reaction required about 5 minutes without external heating. Usually, however, the initial vigorous reaction is followed by a short period of warming at 90–100° C.

Silver may be obtained from the silver chloride in a number of ways. I prefer to use a method described by Firth and Higson (Jour. Soc. Chem. Indus. 42:427 T (1923). This method comprises dissolving the silver chloride in concentrated ammonium hydroxide, with subsequent reduction of the resulting silver ammonium chloride with sodium hypo-sulfite ($Na_2S_2O_4$; commercially known as hydrosulfite) solution.

The iodine monochloride, which is formed in the above process, is stable in the acid solution. Hydrolysis of the iodine monochloride, by which eight-tenths of the iodine is precipitated and two-tenths converted to soluble iodic acid, is brought about by adding an alkali solution (I prefer sodium hydroxide) to the ice-cold, diluted aqua regia solution until it is only just acid to litmus. This hydrolysis is described in Mellor's "Comprehensive Treatise on Inorganic and Theoretical Chemistry", Vol. 2, p. 118 (1922).

This reaction is substantially as follows:

$$ICl + H_2O \longrightarrow HCl + HIO$$
$$5HIO \longrightarrow 2I_2 + HIO_3 + 2H_2O$$

The remaining two-tenths of the iodine, in solution as iodic acid, is precipitated by the addition of the calculated quantity of sodium hyposulfite solution. The calculation of the required amount is based on the following equation which also shows the course of the reaction:

$$6HIO_3 + 5Na_2S_2O_4 + 2H_2O \longrightarrow 3I_2 + 10NaHSO_4$$

The solution is again made just acid to litmus by the addition of more alkali. An excess of alkali should be avoided to prevent solution of liberated iodine. Excess sodium hyposulfite must also be avoided to prevent liberated iodine from being reduced to soluble sodium iodide and hence lost in the filtrate. The precipitated iodine is recovered by filtration. It is washed with ice water and may be dried in a closed system in the presence of a suitable drying agent. To obtain it in pure form sublimation may be employed.

The direct chlorination of silver iodide with chlorine, whereby iodine is liberated with the simultaneous formation of silver chloride possesses several disadvantages which interfere with its smooth functioning. The chief objection to this method for obtaining iodine from silver iodide is the exothermic character of the reaction which may produce sufficient heat to fuse the silver iodide-chloride mass thereby preventing the penetration of the chloride to complete the reaction. It is also difficult to separate the iodine from the fused cake where such fusion has taken place. In addition to this the resulting silver chloride is in undesirable physical condition for its further use. Chlorination of silver iodide suspended in a chlorinated organic liquid requires the employment of a large amount of the liquid to dissolve the liberated iodine and the recovery of the iodine from the solution involves a further extraction with aqueous alkali and subsequent precipitation of the iodine by acidification. An alternative procedure is to use a smaller amount and a sufficient excess of chlorine to convert the insoluble iodine to soluble iodine chloride. This requires operation in a water-free system to prevent hydrolysis of the iodine chloride. Cooling of the mixture is sometimes necessary to prevent loss of the solvent. In my process the liberated iodine is held in solution as iodine chloride which is stable in the aqua regia solution. The iodine is recovered directly from this solution after dilution and removal of the resulting insoluble silver chloride. The heat of the reaction is dissipated in the solution so that cooling is unnecessary. The silver chloride which is formed is in a fine state of subdivision and is therefore suitable for recovery of silver therefrom or for its use in unchanged state.

My invention is illustrated but not limited by the following example:

*Conversion of silver iodide to silver chloride*: To 75.0 gms. (0.32 mol.) of silver iodide (40-mesh) was added 61 ml. of concentrated nitric acid and 162 ml. of concentrated hydrochloric acid (sufficient to produce 0.64 mol. of chlorine). The mixture, which at first darkened, was stirred for five minutes at the end of which time the initial vigorous reaction had subsided. It was heated on the steam bath for twenty-five minutes with frequent shaking and then diluted with 250 ml. of distilled water and cooled in ice. The precipitate was filtered off, thoroughly washed with water and dried to constant weight at 100–105°. Calcd. for AgCl:45.80 gms. Found: 45.72 gms., 45.50 gms.

*Reduction of silver chloride to silver*: The silver chloride, obtained in the above-described experiment, was dissolved by shaking with 400 ml. of concentrated ammonium hydroxide. Solution was complete but a small quantity of insoluble material gradually separated. This was filtered off and shaken with more ammonium hydroxide which dissolved it. To the filtered solution which possessed a very slight turbidity, was added an excess of sodium hyposulfite solution. The precipitated silver was filtered, washed with water and dried to constant weight at 100–105°. Calcd. for Ag:34.47 gms. Found: 33.07, 33.80 gms.

*Recovery of iodine*: The diluted aqua regia from the above-described experiment was cooled in ice and sodium hydroxide solution was added until just acid to litmus. A solution containing 9.3 gms. of sodium hyposulfite was then added and the solution again made just acid to litmus. The precipitated iodine was filtered on a Buchner funnel using a hardened paper. To the filtrate an additional small quantity of hyposulfite was added causing a little more iodine to precipitate. The calculated amount is not quite sufficient probably due to the oxidizing action of some chlorine or hypochlorous acid which is present. This iodine was added to the first portion which was washed with ice water, filtered and dried in a desiccator over concentrated sulfuric acid for thirty-six hours. Calcd. for $I_2$:40.54 gms. Found: 39.12 gms.

In another similar experiment, designed to show the course of the hydrolysis of the iodine monochloride already referred to, the initially precipitated eight-tenths of the iodine was filtered off before the soluble iodic acid was reduced with sodium hyposulfite solution. To the faintly acid (to litmus) filtrate was added a solution containing an excess of barium nitrate. The solution was allowed to stand over night, cooled in ice and the barium iodate was filtered off. The precipitate was washed with dilute hydrochloric acid followed by water and dried to constant weight at 110–115°. Calcd. for $Ba(IO_3)_2 \cdot H_2O$:16.16 gms. Found: 16.92 gms.

Having fully disclosed my discovery, I claim:

1. The process which comprises treating silver iodide with aqua regia, diluting the aqua regia solution with water recovering the resulting silver chloride, reducing the silver chloride to free silver, and recovering the iodine from the diluted aqua regia.

2. The process of obtaining free silver and iodine from silver iodide which comprises converting the silver iodide to silver chloride by treating the silver iodide with aqua regia, diluting the aqua regia solution with water recovering the resulting precipitated silver chloride, reducing the silver chloride to free silver by dissolving the silver chloride in ammonium hydroxide and treating the resulting silver ammonium chloride with a reducing agent, recovering the iodine from the diluted aqua regia by hydrolizing with alkali solution to form free iodine and iodic acid, and reducing the iodic acid to free iodine with a reducing agent.

3. A process of obtaining free silver from silver iodide which comprises treating the silver iodide with aqua regia, recovering the resulting silver chloride and reducing the silver chloride to free silver.

4. The process of obtaining iodine from silver iodide which comprises treating the silver iodide with aqua regia, removing the resulting precipitated silver chloride and recovering the iodine from the remaining diluted aqua regia.

5. The process of obtaining free silver from silver iodide which comprises conversion of the silver iodide to silver chloride by treating the silver iodide with aqua regia and dissolving the silver chloride in ammonium hydroxide followed by subsequent reduction of the resulting silver ammonium chloride with a reducing agent.

6. The process of obtaining free iodine from silver iodide comprising the conversion of the iodine of silver iodide to iodine monochloride by treating the silver iodide with aqua regia; hydrolizing the iodine monochloride by the addition of alkali solution, to form free iodine and iodic acid; and reducing the iodic acid to free iodine with a reducing agent.

JOSEPH R. SPIES.